(12) United States Patent
Hung et al.

(10) Patent No.: US 12,259,548 B2
(45) Date of Patent: Mar. 25, 2025

(54) LIGHT GUIDE DEVICE AND DISPLAY APPARATUS USING THE SAME

(71) Applicant: ASUSTeK COMPUTER INC., Taipei (TW)

(72) Inventors: Wen-Chang Hung, Taipei (TW); Yu-Chieh Cheng, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 502 days.

(21) Appl. No.: 17/666,557

(22) Filed: Feb. 8, 2022

(65) Prior Publication Data

US 2023/0221551 A1 Jul. 13, 2023

(30) Foreign Application Priority Data

Jan. 12, 2022 (TW) .................................. 111101249

(51) Int. Cl.
*G02B 27/01* (2006.01)
*F21V 8/00* (2006.01)

(52) U.S. Cl.
CPC ....... *G02B 27/0101* (2013.01); *G02B 6/0016* (2013.01); *G02B 6/0038* (2013.01)

(58) Field of Classification Search
CPC .. G02B 6/0015; G02B 6/0016; G02B 6/0038; G02B 6/34; G02B 6/4214; G02B 6/122;
(Continued)

(56) References Cited

U.S. PATENT DOCUMENTS 7,764,413 B2 7/2010 Levola
11,860,573 B1 * 1/2024 Wang .................. G02B 5/3016
(Continued)

FOREIGN PATENT DOCUMENTS

CN 101765793 11/2011
CN 102809105 A * 12/2012 ........... G02B 6/0011
(Continued)

OTHER PUBLICATIONS

CN_109073883_B (English translation) (Year: 2017).*
(Continued)

*Primary Examiner* — Marin Pichler
*Assistant Examiner* — Mary A El-Shammaa
(74) *Attorney, Agent, or Firm* — JCIPRNET (57) ABSTRACT

A light guide substrate, including a light coupling-in region with multiple first gratings, a light expansion region with multiple sub light expansion regions, and a light coupling-out region, is provided. Each sub light expansion region includes multiple second gratings. The sub light expansion regions include a first set of sub light expansion regions and a second set of sub light expansion regions. Each second grating in the first set of sub light expansion regions includes a first microstructure and a second microstructure. The light coupling-out region includes multiple third gratings. When an image light enters the light guide substrate from the light coupling-in region through the first gratings, the image light is first transmitted to the light expansion region in the light guide substrate, then transmitted to the light coupling-out region through the second gratings, and then emitted from the light coupling-out region through the third gratings.

15 Claims, 7 Drawing Sheets

(58) Field of Classification Search
CPC ............ G02B 27/0101; G02B 27/0172; G02B 2006/12107; G02B 5/18; G02B 5/1814; G02B 5/1819; G02B 5/1842
See application file for complete search history.

(56) References Cited

U.S. PATENT DOCUMENTS

| | | | | |
|---|---|---|---|---|
| 2003/0113067 | A1* | 6/2003 | Koh | G02B 6/3596 385/39 |
| 2011/0038049 | A1 | 2/2011 | Vallius et al. | |
| 2019/0361156 | A1 | 11/2019 | Tervo | |
| 2021/0191180 | A1* | 6/2021 | Malhotra | C08L 67/00 |
| 2021/0199970 | A1* | 7/2021 | Huang | G02B 27/0172 |
| 2022/0091323 | A1* | 3/2022 | Yaroshchuk | G02B 6/29304 |
| 2022/0206295 | A1* | 6/2022 | Calafiore | G02B 27/0101 |
| 2023/0085138 | A1* | 3/2023 | Huang | G02B 27/0172 359/13 |
| 2023/0161217 | A1* | 5/2023 | Feng | G02B 27/0172 385/10 |

FOREIGN PATENT DOCUMENTS

| | | | | |
|---|---|---|---|---|
| CN | 103459995 B | * | 5/2016 | ................ G01J 3/02 |
| CN | 105556680 B | * | 12/2017 | ............. G02B 1/002 |
| CN | 111566544 A | * | 8/2020 | ........... C23C 14/042 |
| CN | 12630966 | | 4/2021 | |
| CN | 109073883 B | * | 6/2021 | ......... G02B 27/0081 |
| CN | 113885119 A | * | 1/2022 | |
| WO | WO-03052467 A1 | * | 6/2003 | ........... G02B 26/125 |
| WO | WO-2016031712 A1 | * | 3/2016 | ........... G02B 5/1866 |
| WO | WO-2017219433 A1 | * | 12/2017 | ............. G02B 27/00 |
| WO | WO-2018175653 A1 | * | 9/2018 | ......... G02B 27/0101 |
| WO | WO-2022098827 A1 | * | 5/2022 | ......... G02B 27/0081 |
| WO | WO-2023160159 A1 | * | 8/2023 | ......... G02B 27/0081 |

OTHER PUBLICATIONS

WO_2016031712_A1 (English translation) (Year: 2016).*
WO_2017219433_A1 (English translation) (Year: 2017).*
WO_2023160159_A1 (English translation) (Year: 2023).*
CN_102809105_A (English Translation) (Year: 2012).*
CN_103459995_B (English Translation) (Year: 2016).*
CN_105556680_B (English Translation) (Year: 2017).*
CN_113885119_A (English Translation) (Year: 2022).*
CN-111566544-A (English Translation) (Year: 2020).*
Ting-Wei Huang et al., "Metagrating-based augmented reality near-eye display", Proc. of SPIE, Mar. 27, 2021, pp. 1-7.

* cited by examiner

LIGHT GUIDE DEVICE AND DISPLAY APPARATUS USING THE SAME

CROSS-REFERENCE TO RELATED APPLICATION

This application claims the priority benefit of Taiwan application serial no. 111101249, filed on Jan. 12, 2022. The entirety of the above-mentioned patent application is hereby incorporated by reference herein and made a part of this specification.

BACKGROUND

Technical Field

The disclosure relates to a light guide substrate and a display apparatus.

Description of Related Art

Currently, most light guide elements (such as total reflection light guides and beam expanding elements) used in waveguide-type augmented reality (AR) glasses on the market use slanted grating structures. Although the slanted grating structure can be fully utilized in terms of light efficiency, it is difficult to mass-produce, especially when adopting nano-imprinting, where the draft angle needs to be considered. Although a right angled grating structure is easier to implement in a semiconductor process, since the grating transmits light at different angles, and the light guide element only utilizes one of the light components, that the light output efficiency is low.

SUMMARY

The disclosure provides a light guide substrate, which includes a light coupling-in region, a light expansion region, and a light coupling-out region. The light coupling-in region includes multiple first gratings. The light expansion region includes multiple sub light expansion regions, and each sub light expansion region includes multiple second gratings. The sub light expansion regions include a first set of sub light expansion regions and a second set of sub light expansion regions. Each second grating in the first set of sub light expansion regions includes a first microstructure and a second microstructure. The light coupling-out region includes multiple third gratings. When an image light enters the light guide substrate from the light coupling-in region through the first gratings, the image light is first transmitted to the light expansion region in the light guide substrate, then transmitted to the light coupling-out region through the second gratings, and then emitted from the light coupling-out region through the third gratings.

The disclosure also provides a display apparatus, which includes a display module and a light guide substrate. The display module is suitable for providing an image light. The light guide substrate includes a light coupling-in region, a light expansion region, and a light coupling-out region. The light coupling-in region includes multiple first gratings. The light expansion region includes multiple sub light expansion regions, and each sub light expansion region includes multiple second gratings. The sub light expansion regions include a first set of sub light expansion regions and a second set of sub light expansion regions. Each second grating in the first set of sub light expansion regions includes a first microstructure and a second microstructure. The light coupling-out region includes multiple third gratings.

When an image light enters the light guide substrate from the light coupling-in region through the first gratings, the image light is first transmitted to the light expansion region in the light guide substrate, then transmitted to the light coupling-out region through the second gratings, and then emitted from the light coupling-out region through the third gratings.

The disclosure further provides a light guide substrate, which includes multiple sub light guide substrates arranged in a stack. Each sub light guide substrate includes a light coupling-in region, a light expansion region, and a light coupling-out region.

The light coupling-in region includes multiple first gratings. The light expansion region includes multiple sub light expansion regions, and each sub light expansion region includes multiple second gratings. The sub light expansion regions include a first set of sub light expansion regions and a second set of sub light expansion regions.

Each second grating in the first set of sub light expansion regions includes a first microstructure and a second microstructure. The light coupling-out region includes multiple third gratings.

When an image light enters each sub light guide substrate from the light coupling-in region through the first gratings, the image light is first transmitted to the light expansion region in each sub light guide substrate, then transmitted to the light coupling-out region through the second gratings, and then emitted from the light coupling-out region through the third gratings. Based on the above, the light guide substrate or the display apparatus in the disclosure adopts a double vertical column grating structure, so that the light guide substrate or the display apparatus is easy to manufacture and has better light guide efficiency.

DETAILED DESCRIPTION OF DISCLOSED EMBODIMENTS

Figure 1:
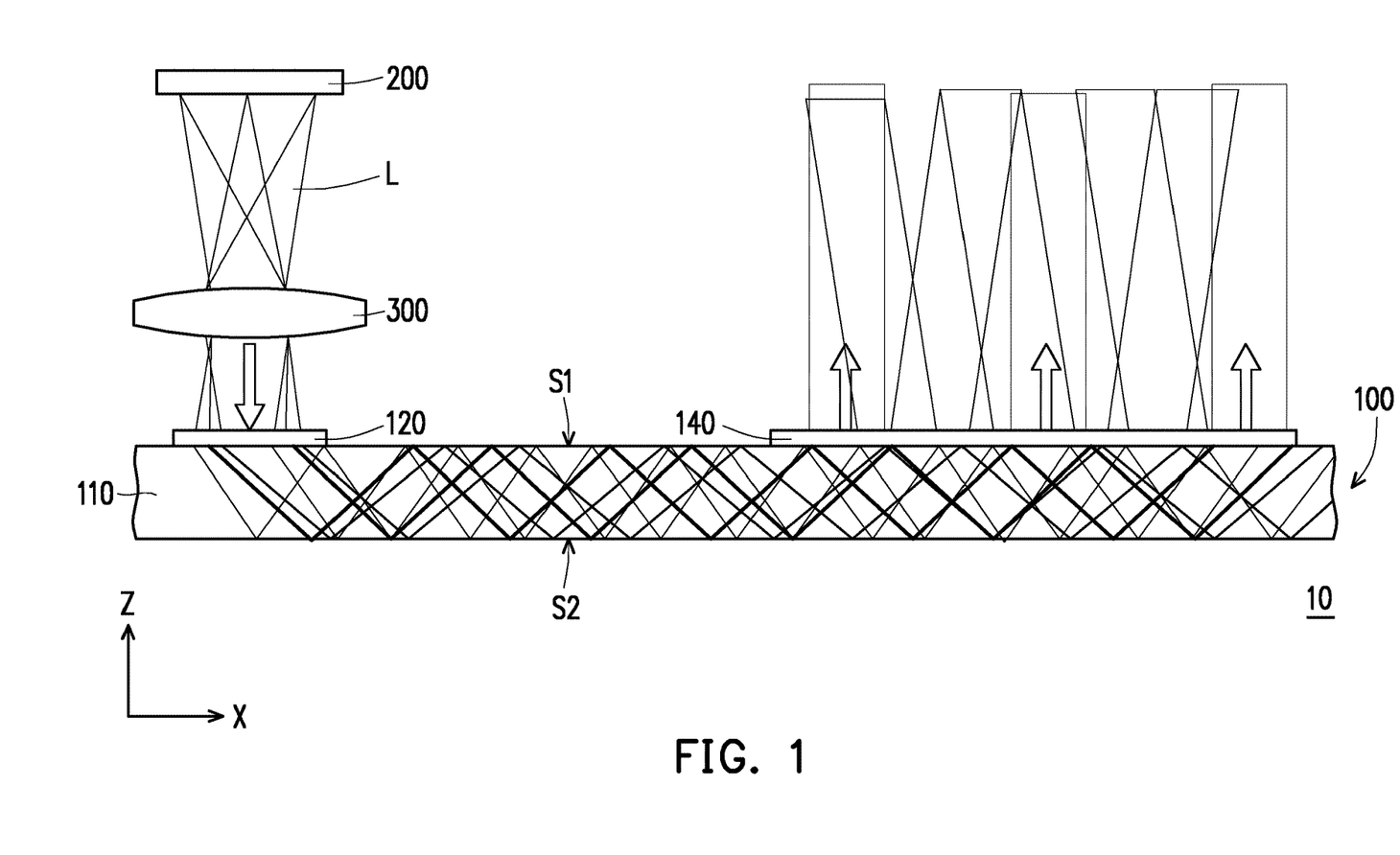
FIG. 1 is a front schematic view of a display apparatus according to an embodiment of the disclosure.
Figure 2:
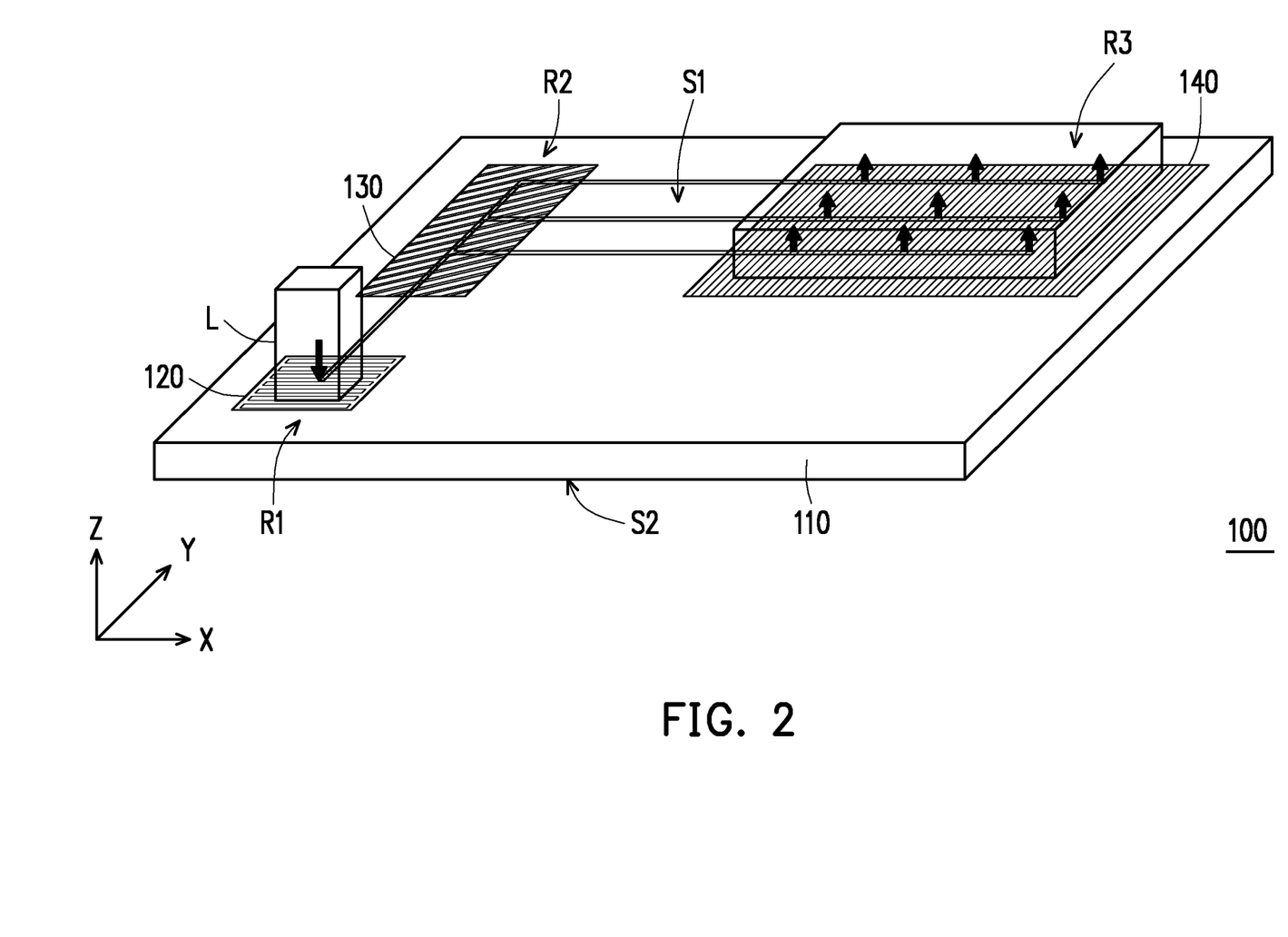
FIG. 2 is a three dimensional schematic view of a light guide substrate in the display apparatus of FIG. 1.

FIG. 1 is a front schematic view of a display apparatus according to an embodiment of the disclosure. FIG. 2 is a three dimensional schematic view of a light guide substrate in the display apparatus of FIG. 1. Referring to FIG. 1 and FIG. 2 simultaneously, an embodiment of the disclosure provides a display apparatus 10 including a display module 200 and a light guide substrate 100. The display module 200 is suitable for providing an image light L. The display module 200 is, for example, a liquid crystal display or a light emitting diode display, which is not limited in the disclosure.

In an embodiment, the light guide substrate 100 includes a light coupling-in region R1, a light expansion region R2, and a light coupling-out region R3. Specifically, the light guide substrate 100 includes a substrate 110. The substrate 110 has a first surface S1 and an opposite second surface S2. The light coupling-in region R1, the light expansion region R2, and the light coupling-out region R3 are disposed on the first surface S1.

The light coupling-in region R1 includes multiple first gratings 120, the light expansion region R2 includes multiple second gratings 130, and the light coupling-out region R3 includes multiple third gratings 140. The image light L enters the light guide substrate 100 from the light coupling-in region R1 through the first gratings 120, and is transmitted in the light guide substrate 110 by total reflection. The image light L is first transmitted to the light expansion region R2 in the light guide substrate 100, then transmitted to the light coupling-out region R3 through the second gratings 130, and then emitted from the light coupling-out region R3 through the third gratings 140.

After the image light L is emitted from the light guide substrate 100, the image light L is viewed by a user on a side of the first surface S1. The light guide substrate 100 is suitable for allowing a background light to pass through from a side of the second surface S2, so that the user can see both the image light L and the background light at the same time. That is, the image light L is emitted from the light guide substrate 100 to form an augmented reality image that is viewed by the user.

FIG. 1 illustrates that the image light L is emitted from a side of the first surface S1. In another embodiment, the light guide substrate 100 may also be designed, so that the image light L is emitted from a side of the second surface S2, and that the background light passes through from a side of the first surface S1 to be viewed by a user on a side of the second surface S2.

In an embodiment, the first gratings 120 are disposed in the light coupling-in region R1. The second gratings 130 are disposed in the light expansion region R2. The third gratings 140 are disposed in the light coupling-out region R3. The first gratings 120 are perpendicular to the third gratings 140. The second gratings 130 are neither parallel nor perpendicular to the first gratings 120 and the third gratings 140.

After the image light L is transmitted from the light coupling-in region R1 to the light expansion region R2, the image light L is expanded in a first direction (i.e., the y direction in FIG. 2) through the second gratings 130. After the image light L is transmitted from the light expansion region R2 to the light coupling-out region R3, the image light L is expanded in a second direction (i.e., the x direction in FIG. 2) through the third gratings 140.

In an embodiment, the area of the light coupling-in region R1 is smaller than the area of the light expansion region R2, and the area of the light expansion region R2 is smaller than the area of the light coupling-out region R3.

In an embodiment, the material of the substrate 110 includes a translucent material, such as silicon dioxide ($SiO_2$) with a refractive index in the range of 1.4 to 2.2.

In an embodiment, the material of the first gratings 120, the second gratings 130, or the third gratings 140 is a dielectric material with low absorption and low loss of visible light and near-infrared light, such as titanium dioxide ($TiO_2$) with a refractive index in the range of 2.4 to 2.6.

In an embodiment, the refractive index of the first gratings 120, the second gratings 130, or the third gratings 140 is greater than the refractive index of the light guide substrate 110.

Figure 3:
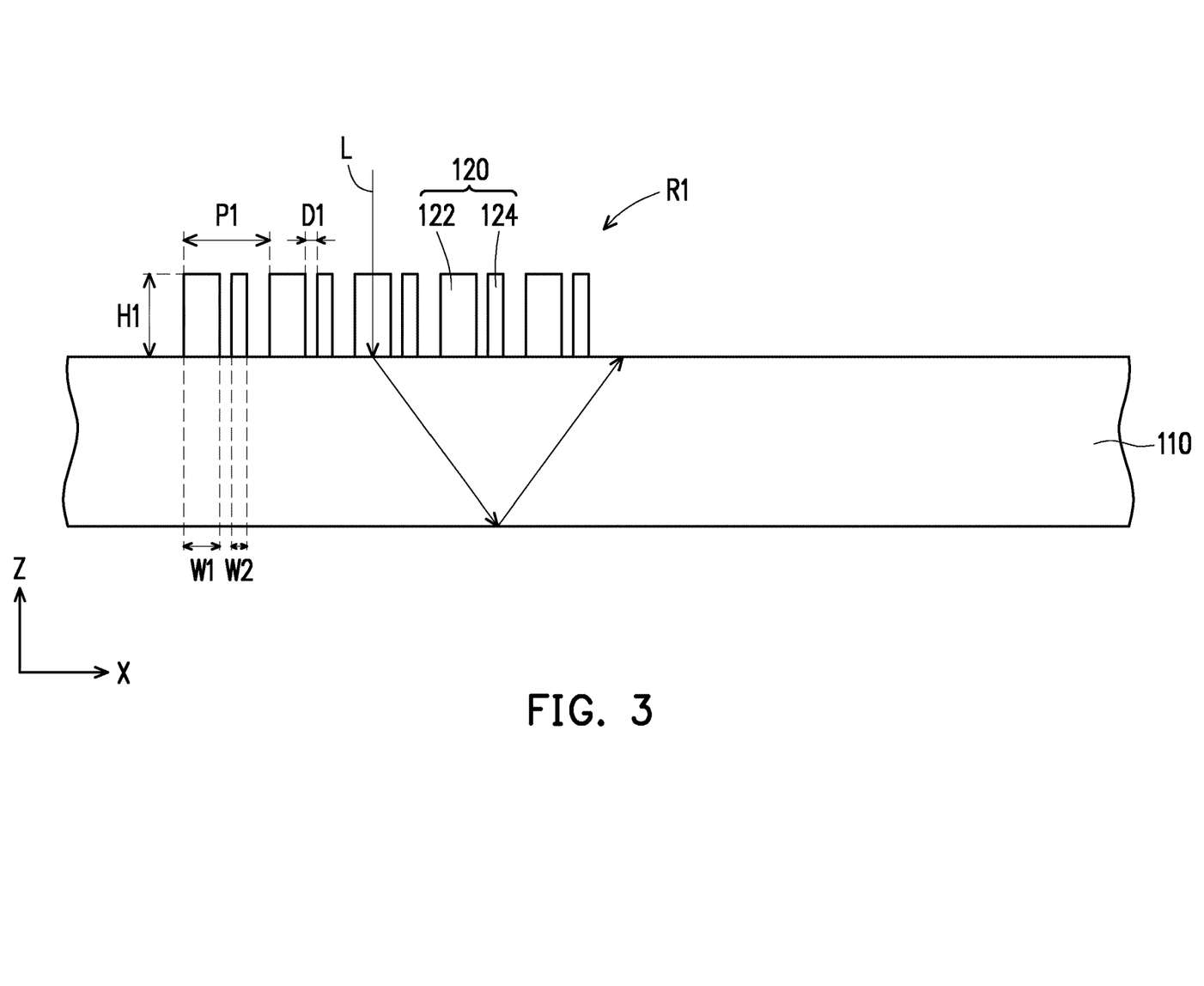
FIG. 3 is an enlarged schematic view of a light coupling-in region in the light guide substrate of FIG. 2.

FIG. 3 is an enlarged schematic view of a light coupling-in region in the light guide substrate of FIG. 2. Referring to FIG. 2 and FIG. 3 simultaneously, in this embodiment, each of the first gratings 120 in the light coupling-in region R1 includes a third microstructure 122 and a fourth microstructure 124, wherein the third microstructure 122 and the fourth microstructure 124 are right angled gratings. That is, each of the first gratings 120 in the light coupling-in region R1 is composed of double vertical columns.

In an embodiment, a width W1 of the third microstructure 122 or a width W2 of the fourth microstructure 124 is greater than 0 and less than 445 nm. A distance D1 between the third microstructure 122 and the fourth microstructure 124 is greater than 0 and less than 525 nm. In addition, an aspect ratio H1/W1 or H1/W2 of the third microstructure 122 or the fourth microstructure 124 is greater than 0 and less than 10.

In an embodiment, the heights H1 of the third microstructure 122 and the fourth microstructure 124 are the same.

In an embodiment, a width ratio W1/W2 between the third microstructure 122 and the fourth microstructure 124 falls within the range of 0.2 to 5.5 or falls within the range of 0.23 to 5.2.

Figure 4:
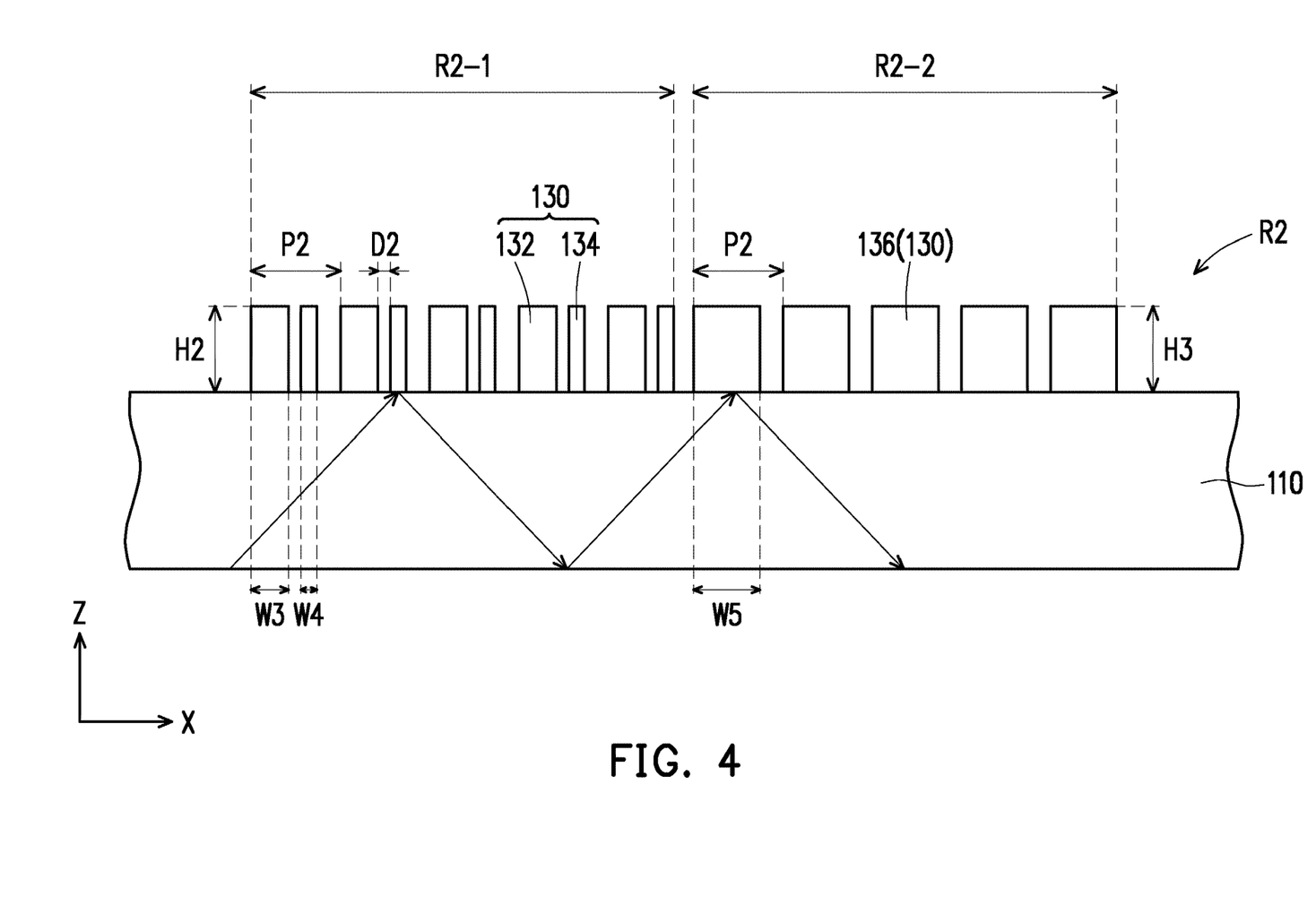
FIG. 4 is an enlarged schematic view of the light expansion region in the light guide substrate of FIG. 2.

FIG. 4 is an enlarged schematic view of the light expansion region in the light guide substrate of FIG. 2. Referring to FIG. 2 and FIG. 4 simultaneously, in this embodiment, the light expansion R2 includes multiple sub light expansion regions R2-1 and R2-2.

When the image light L is transmitted from the light coupling-in region R1 to the first sub light expansion region R2-1, a part of the image light L is guided to the light coupling-out region R3, and a remaining part of the image light L is guided to the next sub light expansion region R2-2, thus generating the effect of light expansion. By analogy, all the parts of the image light L are guided to the light coupling-out region R3.

FIG. 2 illustrates that the light expansion region R2 is rectangular. However, the disclosure is not limited thereto, and the shape of the light expansion region R2 can be determined according to the requirements.

In an embodiment, the sub light expansion regions R2-1 and R2-2 are defined as: in any two adjacent sub light expansion regions R2-1 and R2-2, the grating parameters in the second gratings 130 are different, wherein the grating parameters are, for example, the structure, height, width, and spacing between the structures of the gratings. The sub light expansion regions R2-1 and R2-2 have the same or different areas.

Moreover, each of the sub light expansion regions R2-1 and R2-2 is configured with multiple second gratings 130. The sub light expansion regions R2-1 and R2-2 include a first set of sub light expansion regions and a second set of sub light expansion regions. Each of the second gratings 130 in the first set of sub light expansion regions includes a first microstructure 132 and a second microstructure 134. That is, the sub light expansion region R2-1 belongs to the first set of the sub light expansion regions, and each of the second gratings 130 in the sub light expansion region R2-1 is composed of double vertical columns.

In an embodiment, a width W3 of the first microstructure 132 or a width W4 of the second microstructure 134 is greater than 0 and less than 445 nm, a distance D2 between the first microstructure 132 and the second microstructure 134 is greater than 0 and less than 525 nm, and an aspect ratio H2/W3 or H2/W4 of the first microstructure 132 or the second microstructure 134 is greater than 0 and less than 10.

In an embodiment, the heights H2 of the first microstructure 132 and the second microstructure 134 are the same.

In an embodiment, a width ratio W3/W4 between the first microstructure 132 and the second microstructure 134 falls within the range of 0.2 to 5.5 or falls within the range of 0.23 to 5.2.

In an embodiment, each of the second gratings 130 in the second set of sub light expansion regions is a single microstructure 136. That is, the sub light expansion region R2-2 belongs to the second set of sub light expansion regions, and each of the second gratings 130 in the sub light expansion region R2-2 is a single vertical column. In addition, the second gratings 130 in the remaining sub light expansion regions of the light expansion region R2 are composed of double vertical columns or a single vertical column according to requirements, which is not limited in the disclosure.

In an embodiment, a width W5 of the single microstructure 136 is greater than 0 and less than 445 nm, and an aspect ratio H3/W5 of the single microstructure 136 is greater than 0 and less than 10.

Figure 5:
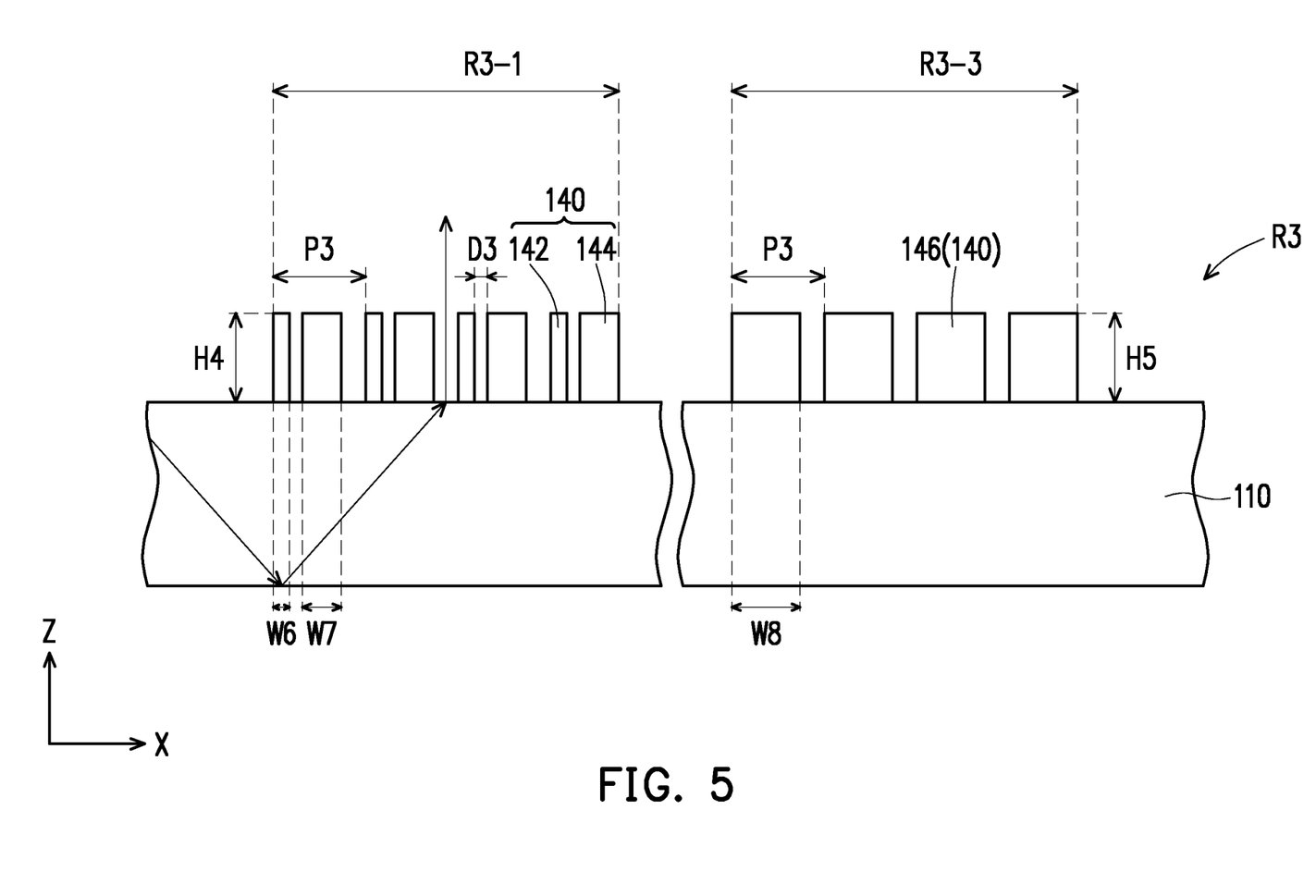
FIG. 5 is an enlarged schematic view of the light coupling-out region in the light guide substrate of FIG. 2.

FIG. 5 is an enlarged schematic view of the light coupling-out region in the light guide substrate of FIG. 2. Referring to FIG. 2 and FIG. 5 simultaneously, in this embodiment, the light coupling-out region R3 includes multiple sub light coupling-out regions R3-1 and R3-3. The sub light coupling-out regions R3-1 and R3-3 are defined as: in any two adjacent sub light coupling-out regions R3-1 and R3-3, the grating parameters in the third gratings 140 are different, wherein the grating parameters are, for example, the structure, height, width, and spacing between the structures of the gratings.

The sub light coupling-out regions R3-1 and R3-3 have the same or different areas. Moreover, each of the sub light coupling-out regions R3-1 and R3-3 includes multiple third gratings 140. The sub light coupling-out regions R3-1 and R3-3 include a first set of sub light coupling-out regions and a second set of sub light coupling-out regions.

Each of the third gratings 140 in the first set of sub light coupling-out regions includes a fifth microstructure 142 and a sixth microstructure 144. That is, the sub light coupling-out region R3-1 belongs to the first set of sub light-coupling-out regions, and each of the third gratings 140 in the sub light coupling-out region R3-1 is composed of double vertical columns.

In an embodiment, a width W6 of the fifth microstructure 142 or a width W7 of the sixth microstructure 144 is greater than 0 and less than 445 nm, a distance D3 between the fifth microstructure 142 and the sixth microstructure 144 is greater than 0 and less than 525 nm, and an aspect ratio H4/W6 or H4/W7 of the fifth microstructure 142 or the sixth microstructure 144 is greater than 0 and less than 10.

In an embodiment, the heights H4 of the fifth microstructure 142 and the sixth microstructure 144 are the same.

In an embodiment, a width ratio W6/W7 between the fifth microstructure 142 and the sixth microstructure 144 falls within the range of 0.2 to 5.5 or falls within the range of 0.23 to 5.2.

In an embodiment, each of the third gratings 140 in the second set of sub light coupling-out regions is a single microstructure 146. That is, the sub light coupling-out region R3-3 belongs to the second set of sub light coupling-out regions, and each of the third gratings 140 in the sub light coupling-out region R3-3 is a single vertical column. In addition, the third gratings 140 in the remaining sub light coupling-out regions of the light coupling-out region R3 are composed of double vertical columns or a single vertical column according to requirements, which is not limited in the disclosure.

In an embodiment, a width W8 of the single microstructure 146 in the sub light coupling-out region R3-3 is greater than 0 and less than 445 nm, and an aspect ratio H5/W8 of the single microstructure 146 in the sub light coupling-out region R3-3 is greater than 0 and less than 10.

Referring to FIG. 3, FIG. 4, and FIG. 5 simultaneously, in this embodiment, the first gratings 120 have the same first pitch P1 in between, the second gratings 130 have the same second pitch P2 in between, and the third gratings 140 have the same third pitch P3 in between. The first pitch P1 is the same as the third pitch P3, and the first pitch P1 is different from the second pitch P2.

When the first pitch P1 is the same as the third pitch P3, the image light L has the same diffraction angle in the light coupling-in region R1 and the light coupling-out region R3, so that an image output by the display module 200 consistent with the image viewed in the light coupling-out region R3. When the first pitch P1 is different from the second pitch P2, it is beneficial for expanding a light beam.

Referring to FIG. 1 again, in this embodiment, the display apparatus 10 further includes a lens set 300. The lens set 300 is used for collimating the image light L passing through.

Figure 6:
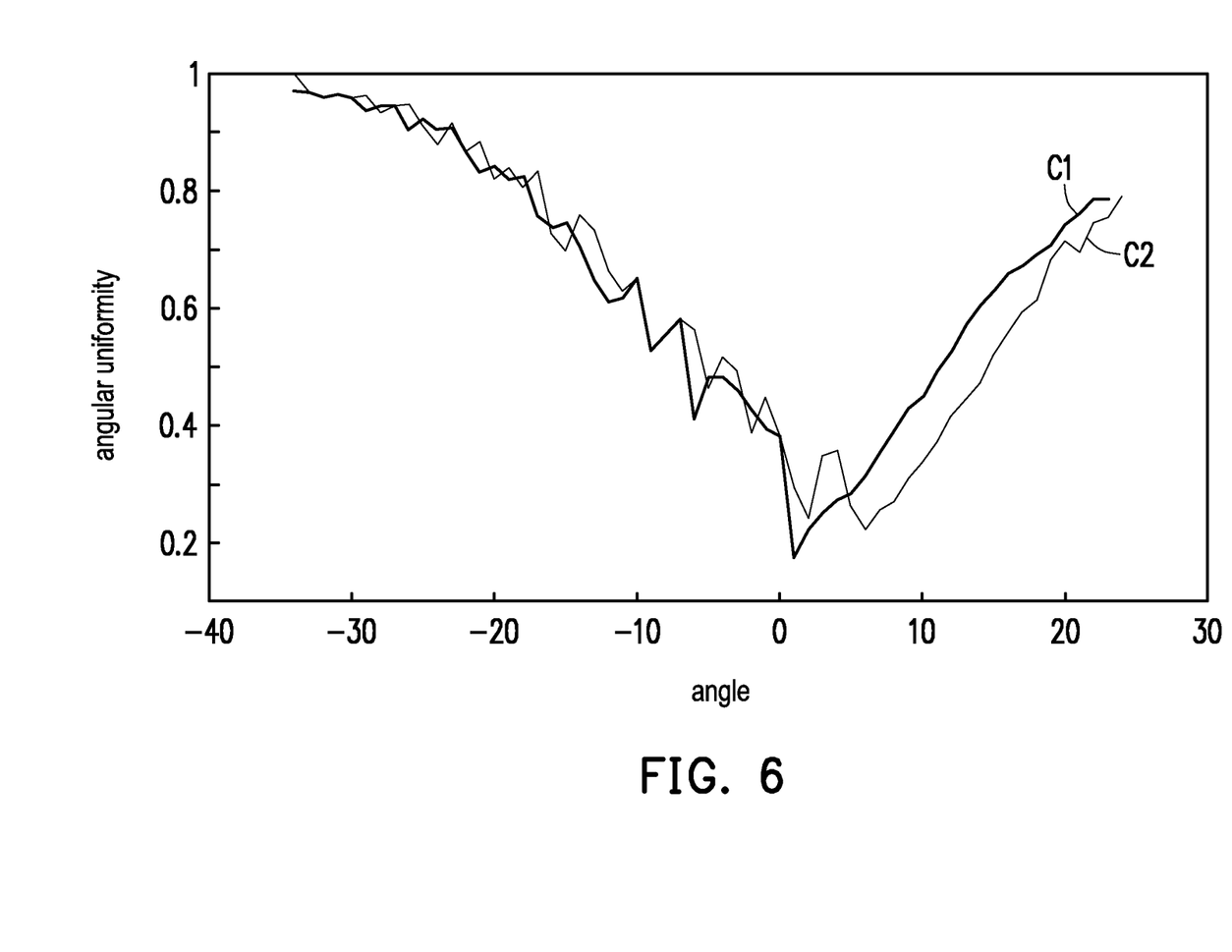
FIG. 6 is a graph showing the contrast ratio versus the viewing angle of the display apparatus after the image light is emitted according to an embodiment of the disclosure.

FIG. 6 is a graph illustrating the contrast ratio versus the viewing angle of the display apparatus after the image light is emitted according to an embodiment of the disclosure. Curves C1 and C2 in FIG. 6 each illustrate the contrast ratio versus the viewing angle after the image light L is incident on the light guide substrate 100 vertically or obliquely (e.g., 5 degrees).

Referring to FIG. 6, the angular uniformity ranges from about −32 degrees to 22 degrees. That is, the light guide substrate 100 of an embodiment of the disclosure can provide a field of view (FOV) ranging from about 50 to 60 degrees in the light coupling-out region R3.

Based on the above, since the light guide substrate 100 or the display apparatus 10 of the disclosure adopts a double vertical column grating structure, the light efficiency and the field of view are improved. When the structure is a double vertical column nanostructure, the light intensity can be concentrated in one of the light components, while suppressing the other light components, and reducing the input loss.

At the same time, the structural parameters of the double vertical column structure can also be optimized, and a specific energy distribution can be performed for the light efficiency of a specific light component. When the light is expanded in the light guide substrate 100, the uniformity of the expanded light can be maintained, and the image light L maintains a good light efficiency of the specific light component at a large angle, so as to alleviate the problem of vignetting.

In addition, the light guide substrate 100 or the display apparatus 10 of the embodiment of the disclosure adopting the double vertical column grating structure is also beneficial for fabrication with a semiconductor exposure process, such as nano-imprinting. Also, when an imprinting process is used, the vertical column structure is also drafted easily, which makes the process easier.

Figure 7:
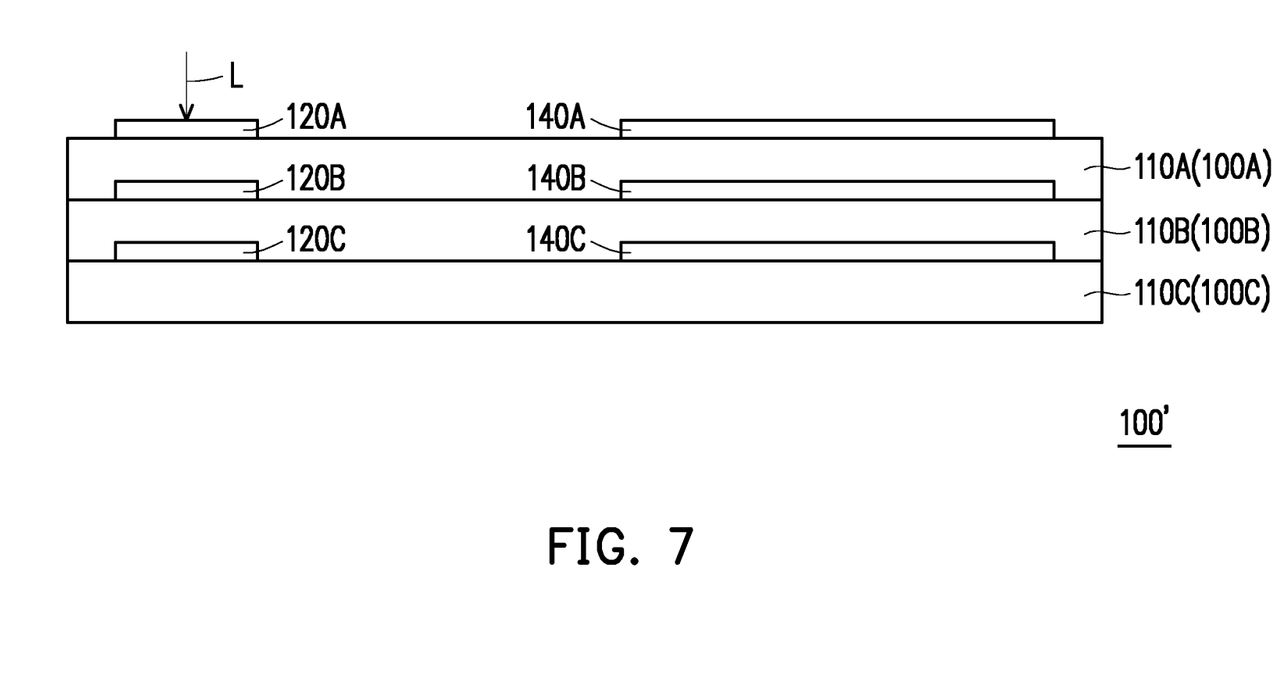
FIG. 7 is a front schematic view of a light guide substrate according to another embodiment of the disclosure.

FIG. 7 is a front schematic view of a light guide substrate according to another embodiment of the disclosure. Referring to FIG. 7, a light guide substrate 100' of FIG. 7 is the same as the light guide substrate 100 of FIG. 2, and the main differences are as follows.

In this embodiment, the light guide substrate 100' includes multiple sub light guide substrates 100A, 100B, and 100C arranged in a stack. Different sub light guide substrates 100A, 100B, and 100C are suitable for transmitting light of different wavelengths in the image light L, such as red light, green light, and blue light, but the disclosure is not limited thereto.

In an embodiment, similar to the light guide substrate 100 of FIG. 2, each of the sub light guide substrates 100A, 100B, and 100C includes a light coupling-in region, a light expansion region, and a light coupling-out region. Specifically, the sub light guide substrate 100A includes a substrate 110A, the sub light guide substrate 100B includes a substrate 110B, and the sub light guide substrate 100C includes a substrate 110C.

The light coupling-in region, the light expansion region, and the light coupling-out region of each of the sub light guide substrates 100A, 100B, and 100C are all disposed on the corresponding substrate 110A and sub light guide substrate 100B. The light coupling-in region includes multiple first gratings 120A, 120B, and 120C. The light expansion region includes multiple sub light expansion regions, and each sub light expansion region includes multiple second gratings. The light coupling-out region includes multiple third gratings 140A, 140B, and 140C.

The gratings parameters in each of the first gratings 120A, 120B, and 120C, the second gratings, and the third gratings 140A, 140B, and 140C are similar to the grating parameters in the first gratings 120, the second gratings 130, and the third gratings 140 in FIG. 2, so descriptions are not repeated here.

When the image light L enters each sub light guide substrate from the light coupling-in region through the first gratings 120A, 120B, and 120C, the image light L is first transmitted to the light expansion region in each sub light guide substrate, then transmitted to the light coupling-out region through the second gratings, and then emitted from the light-coupling-out region through the third gratings 140A, 140B, and 140C.

Based on the above, since the light guide substrate 100' of the disclosure has multiple sub light guide substrates 100A, 100B, and 100C arranged in a stack, the grating structural parameters of the first gratings 120A, 120B, and 120C, the second gratings, and the third gratings 140A, 140B, and 140C may be adjusted for different light wavelengths for producing output images with better quality as a whole.

To sum up, since the light guide substrate or the display apparatus of the disclosure adopts the double vertical column grating structure, the overall output expanded light efficiency of the central field of view is improved, the energy consumption is reduced, and the horizontal and vertical fields of view are increased. The angular uniformity of the light guide substrate after outputting light is improved, so that the vignetting of the light received by the human eye at particular viewing angles is reduced, and a uniform illumination is received within the field of view. In addition, the adoption of the double vertical column grating structure makes it easier to process the light guide substrate or the display apparatus.

What is claimed is:

1. A light guide device, comprising:
  a light coupling-in region, comprising a plurality of first gratings;
  a light expansion region, comprising a plurality of sub light expansion regions, wherein each of the sub light expansion regions comprises a plurality of second gratings, the sub light expansion regions comprise a first set of sub light expansion regions and a second set of sub light expansion regions, and each of the second gratings in the first set of sub light expansion regions only comprises a first microstructure and a second microstructure, wherein widths of the first microstructure, the second microstructure and the second grating in the second set of sub light expansion regions are different from each other;
  a light coupling-out region, comprising a plurality of third gratings; and
  a substrate, wherein the light coupling-in region, the light expansion region and the light coupling-out region are formed on a surface of the substrate, the first microstructure and the second microstructure are vertical columns forming on the surface of the substrate,
  wherein, when an image light enters the light guide device from the light coupling-in region through the first gratings, the image light is first transmitted to the light expansion region in the light guide device, then transmitted to the light coupling-out region through the second gratings, and then emitted from the light coupling-out region through the third gratings.

2. The light guide device according to claim 1, wherein each of the second gratings in the second set of sub light expansion regions is a single microstructure.

3. The light guide device according to claim 1, wherein each of the first gratings in the light coupling-in region comprises a third microstructure and a fourth microstructure.

4. The light guide device according to claim 1, wherein the sub light coupling-out region comprises a plurality of sub light coupling-out regions, each of the sub light coupling-out regions comprises the third gratings, the sub light coupling-out regions comprise a first set of sub light coupling-out regions and a second set of sub light coupling-out regions, and each of the third gratings in the first set of sub light coupling-out regions comprises a fifth microstructure and a sixth microstructure.

5. The light guide device according to claim 4, wherein each of the third gratings in the second set of sub light coupling-out regions is a single microstructure.

6. The light guide device according to claim 1, wherein the first gratings have a same first pitch in between, the second gratings have a same second pitch in between, and the third gratings have a same third pitch in between, wherein the first pitch is the same as the third pitch.

7. The light guide device according to claim 6, wherein the first pitch is different from the second pitch.

8. A display apparatus, comprising:
  a display module, suitable for providing an image light; and
  a light guide device, comprising:
  a light coupling-in region, comprising a plurality of first gratings;
  a light expansion region, comprising a plurality of sub light expansion regions, wherein each of the sub light expansion regions comprises a plurality of second gratings, the sub light expansion regions comprise a first set of sub light expansion regions and a second set of sub light expansion regions, and each of the second gratings in the first set of sub light expansion regions only comprises a first microstructure and a second microstructure, wherein widths of the first microstructure, the second microstructure and the second grating in the second set of sub light expansion regions are different from each other;
  a light coupling-out region, comprising a plurality of third gratings; and a substrate, wherein the light coupling-in region, the light expansion region and the light coupling-out region are formed on a surface of the substrate, the first microstructure and the second microstructure are vertical columns forming on the surface of the substrate, wherein, when the image light enters the light guide device from the light coupling-in region through the first gratings, the image light is first transmitted to the light expansion region in the light guide device, then transmitted to the light coupling-out region through the second gratings, and then emitted from the light coupling-out region through the third gratings.

9. The display apparatus according to claim 8, wherein each of the second gratings in the second set of sub light expansion regions is a single microstructure.

10. The display apparatus according to claim 8, wherein each of the first gratings in the light coupling-in region comprises a third microstructure and a fourth microstructure.

11. The display apparatus according to claim 8, wherein the sub light coupling-out region comprises a plurality of sub light coupling-out regions, each of the sub light coupling-out regions comprises the third gratings, the sub light coupling-out regions comprise a first set of sub light coupling-out regions and a second set of sub light coupling-out regions, and each of the third gratings in the first set of sub light coupling-out regions comprises a fifth microstructure and a sixth microstructure.

12. The display apparatus according to claim 11, wherein each of the third gratings in the second set of sub light coupling-out regions is a single microstructure.

13. The display apparatus according to claim 8, wherein the first gratings have a same first pitch in between, the second gratings have a same second pitch in between, and the third gratings have a same third pitch in between, wherein the first pitch is the same as the third pitch.

14. The display apparatus according to claim 13, wherein the first pitch is different from the second pitch.

15. A light guide device, comprising a plurality of sub light guide devices arranged in a stack, wherein each of the sub light guide devices comprises:

a light coupling-in region, comprising a plurality of first gratings;

a light expansion region, comprising a plurality of sub light expansion regions, wherein each of the sub light expansion regions comprises a plurality of second gratings, the sub light expansion regions comprise a first set of sub light expansion regions and a second set of sub light expansion regions, and each of the second gratings in the first set of sub light expansion regions only comprises a first microstructure and a second microstructure, wherein widths of the first microstructure, the second microstructure and the second grating in the second set of sub light expansion regions are different from each other;

a light coupling-out region, comprising a plurality of third gratings; and a substrate, wherein the light coupling-in region, the light expansion region and the light coupling-out region are formed on a surface of the substrate, the first microstructure and the second microstructure are vertical columns forming on the surface of the substrate, wherein, when an image light enters each of the sub light guide devices from the light coupling-in region through the first gratings, the image light is first transmitted to the light expansion region in each of the sub light guide devices, then transmitted to the light coupling-out region through the second gratings, and then emitted from the light coupling-out region through the third gratings.

* * * * *